United States Patent [19]

Abraham et al.

[11] Patent Number: 5,570,292
[45] Date of Patent: Oct. 29, 1996

[54] INTEGRATED METHOD AND APPARATUS FOR SELECTING, ORDERING AND MANUFACTURING ART GLASS PANELS

[75] Inventors: Loren Abraham; Michael F. Pilla; Jason Bright, all of St. Paul, Minn.

[73] Assignee: Andersen Corporation, Bayport, Minn.

[21] Appl. No.: 195,257

[22] Filed: Feb. 14, 1994

[51] Int. Cl.⁶ .................................................. G06F 19/00
[52] U.S. Cl. .................. 364/473.01; 364/474.24; 364/512; 395/904; 395/919; 65/29.11; 65/DIG. 13
[58] Field of Search ............................. 364/474.24, 468, 364/403, 401, 476, 512, 474.09, 473, 505, 470; 395/139, 904, 912, 921, 923, 919; 428/38; 52/204.59, 311.1, 311.2; 65/29.1, 29.11, DIG. 13

[56] References Cited

U.S. PATENT DOCUMENTS

| | | | |
|---|---|---|---|
| 3,391,392 | 7/1968 | Doyle. | |
| 3,693,168 | 9/1972 | Halkyard et al.. | |
| 4,058,849 | 11/1977 | Fitzgerald et al.. | |
| 4,149,246 | 4/1979 | Goldman. | |
| 4,654,805 | 3/1987 | Shoup, II | 364/474.24 |
| 4,656,603 | 4/1987 | Dunn. | |
| 4,845,651 | 7/1989 | Aizawa et al.. | |
| 4,873,643 | 10/1989 | Powell et al. | 364/468 |
| 4,885,694 | 12/1989 | Pray et al. | 364/512 |
| 4,916,624 | 4/1990 | Collins et al. | 364/470 |
| 4,918,611 | 4/1990 | Shyu et al. | 364/474.24 |
| 4,928,252 | 5/1990 | Gabbe et al.. | |
| 4,939,666 | 7/1990 | Hardman. | |
| 4,949,280 | 8/1990 | Littlefield. | |
| 4,970,658 | 11/1990 | Durbin et al.. | |
| 4,972,318 | 11/1990 | Brown et al. | 364/403 |
| 5,091,869 | 2/1992 | Ingram et al. | 364/512 |
| 5,099,740 | 3/1992 | Minamitaka. | |
| 5,117,366 | 5/1992 | Stong | 364/474.02 |
| 5,121,334 | 6/1992 | Riley et al. | 364/474.24 |
| 5,140,530 | 8/1992 | Guha et al.. | |
| 5,150,304 | 9/1992 | Berchem et al. | 364/474.24 |
| 5,501,888 | 3/1996 | Hanson et al. | 428/38 |

OTHER PUBLICATIONS

"Automatic generation of 2–axis laser–cutter NC machine program and path planning from CAD", *Computers in Industry*, Steven D. Jackson et al., vol. 21, No. 2, Feb. 1993, pp. 223–231.

"The future of waterjet cutting", *Manufacturing Technology International*, T. D. Alkire, 1 Jan. 1990, pp. 201–202, 204.

"Automatisierte Attribut–Programmierung fur die Laser–Blechfertigung", *ZWF Zeitschrift Fur Wirtschaftliche Fertigung und Automatisierung*, T. T. Pham et al., vol. 86, No. 3, 1 Mar. 1991, pp. 117–121.

"3D–Schachtelungssystem fur die Fertigung kleiner Frasteile aus Plattenmaterial", *VDI Zeitschrift*, Von Engelbert Westkamper et al., vol. 135, No. 5, 1 May 1993, pp. 32, 35–37.

PCT International Search Report Dated 18 Jul. 1995; Dated 18 Jul. 1995; Date of Mailing 24 Jul. 1995.

*Primary Examiner*—Roy N. Envall, Jr.
*Assistant Examiner*—Steven R. Garland
*Attorney, Agent, or Firm*—Merchant, Gould, Smith, Edell, Welter & Schmidt, P.A.

[57] ABSTRACT

An integrated system for selecting, ordering and manufacturing art glass panels is provided. An artistic art glass design is combined with a set of design rules specifically applicable to such art glass design to produce a digitized data file uniquely identifying the art glass design. The digitized data file information is used to reconfigure the initial art glass design, according to the entered set of design rules, to conform the art glass design to the unique panel size and shape requirements of a customer. A data file of the reconfigured art glass panel information is forwarded to the manufacturer. The digitized reconfigured file data includes all of the information regarding component sizes, shapes and cutting and assembly instructions required to enable automated assembly and costing for the art glass panel fabrication. Remote input terminals are provided for customers, enabling customized customer design and selection of art glass panels at remote locations, on-line visual review of the customized panels and their calculated costs, and direct ordering from the remote terminals.

21 Claims, 6 Drawing Sheets

INTEGRATED METHOD AND APPARATUS FOR SELECTING, ORDERING AND MANUFACTURING ART GLASS PANELS

FIELD OF THE INVENTION

This invention relates generally to art glass panels, and more specifically to a method for integrating and automating the design and selection, ordering and manufacturing processes for such art glass panels.

CROSS-REFERENCE TO RELATED PATENTS AND APPLICATIONS

The following U.S. patents and U.S. patent applications are herein incorporated by reference to the extent that their respective disclosures and teachings are needed or desired to form a more complete understanding of the present invention or to describe functional portions of this disclosure: U.S. Pat. No. 4,972,318 issued on Nov. 20, 1990, to Brown et al., entitled Order Entry and Inventory Control Method; U.S. patent application Ser. No. 08/016,902 filed on Feb. 12, 1993, now abandoned, by Hanson et al., entitled Divided Light Insert and Kit for Mounting; U.S. patent application Ser. No. 07/716,651 filed on Jun. 14, 1991, now abandoned, by Barnes et al., entitled Graphical Display Driven Database Method and Apparatus; U.S. patent application Ser. No. 08/194,922 filed on Feb. 11, 1994, by Randall W. Smith, Jason Bright and Thomas Varghese, entitled Rule-Based Parametric Design Apparatus and Method; and U.S. patent application Ser. No. filed on Feb. 11, 1994, by Thomas Varghese, Jason Bright and Randall W. Smith, entitled Waterjet Cutting Tool Interface Software. All of the above patents and applications are owned by the common assignee, of the present invention, Andersen Corporation.

BACKGROUND OF THE INVENTION

Art glass panels have allured and captured the hearts and minds of artists, artisans, owners and viewers for centuries. The "art glass" terminology includes not only stained glass panels but also divided light panels of beveled and etched glass creations, as well as such panels which include objects having more three-dimensional properties, such as jewels or the like. Historically, art glass panels have typically been in the form of windows and have been the subject of tedious, time-intensive creations, generally relegated to unique single item designs for cathedrals, churches and religious structures, or for the very wealthy who could afford to commission such expensive artistic creations for their mansions or commercial enterprises. More recently, art glass panels have found acceptance as stand-alone interior panels, or as wall or ceiling lighted panel structures illuminated by background electrical lighting. While there have been attempts to produce art glass panels on a commercial basis for windows that could be used for residential purposes, such attempts have generally been thwarted by excessive costs and/or limited availability in sizes, designs and styles of such products. Accordingly, art glass panels have generally remained as high-priced, uniquely designed novelty or art items.

Historically, art glass panels have been configured in true divided light configuration wherein individual pieces of glass or objects forming the panel are held together by strips of caming which are soldered together to form an integral unitary panel structure. Such caming has a generally U-shaped cross-section that retainably holds the individual glass pieces or objects by their edges and was historically made of lead or leaded material for its ease of bending and shaping to accommodate curved or irregularly shaped pieces of glass or objects. Today's environmental proscription against the use of lead in consumer and building products has resulted in replacement or virtual replacement of the traditionally used lead caming with more environmentally acceptable and safe products such as zinc alloys. For a more complete understanding of the general construction of an art glass panel and use therein of modern alloy caming materials, the reader is referred to U.S. patent application Ser. No. 08/016,902 filed on Feb. 12, 1993, by Hanson et al., entitled Divided Light Inserts and Kit for Mounting, owned by the common assignee of this invention—the contents of which are herein incorporated by reference.

A number of factors have contributed to the excessive costs of art glass panels. Typically, an art glass artisan, having not only artistic ability but also skilled in the knowledge of material strengths, acceptable pattern configurations and structural considerations for creating art glass panels has been required to create an acceptable art glass design. Such gifted artisans that can accommodate the customer's unique needs are difficult to find and are generally quite expensive to retain. As stated above, historic art glass designs are constructed in true divided light configuration, requiring many, often thousands, of individual pieces of glass and objects to be cut in cooperative mating relationship to one another (e.g., in puzzle manner). The cost of the glass pieces and objects alone can be quite expensive, particularly when unique pieces of glass are purchased in small quantities or if particular pieces or objects require special grinding, beveling or shaping. The individual glass pieces and objects must be configured to match the artist's pattern. This requires the labor-intensive process of individually cutting or shaping each piece of glass or object so as to perfectly cooperatively mate with its adjacent pieces of the panel. Typically glass pieces have been cut by a scoring and breaking method, often resulting in high breakage and waste, particularly where the glass pieces include angles or curves. Further, pieces so created often have inherently irregular edge configurations that provide stress points for later breakage of the glass if mounted in a stressed manner. In order to reduce such stress conditions, the artisan will often grind individual glass pieces along their edges and will chamfer their corners by means of labor-intensive hand grinding processes. Forming the art glass panel also requires individual cutting and bending or forming of caming pieces to interconnect and mount each of the glass pieces or objects in precise cooperative mating relationship. Finally, the individual pieces of glass and objects must be assembled, one at a time, with intermediate caming, into a unified single panel, after which the individual caming pieces are soldered together at their junctions to form a unified completed panel. The entire process is very labor intensive, time consuming and expensive and has heretofore not particularly lended itself to commercial practicality.

In an effort to reduce the above labor-intensive processing costs associated with true divided light art glass construction, attempts have been made to produce look-alike products and to substitute other types of decorative glass products in place of a true divided light glass panel. Several such configurations have attempted to simulate the divided light look by gluing or otherwise bonding the individual glass and object pieces together along their edges and by overlaying a single piece of grid or grille structure shaped to look like caming, but made to overlie the bonded glass structure, on one side thereof. Others have used plastic films or the like to simulate the glass pieces, thereby eliminating cutting and bonding individual pieces together. While such attempts have reduced costs involved in constructing true divided light art glass panels, the products produced by such methods generally are not equal in appearance or performance to the traditional divided light glass products in which metal cames are used to divide the individual lights in each panel.

Even after an art glass panel has been designed, its availability for use as a commercially produced item has historically been severely limited, and not generally susceptible to economical mass production. As long as the size and shape of the design remains exactly the same, multiple copies of a particular art glass panel could be produced, gaining some advantage in amortizing the initial design costs over the multiple copies and possibly in the ability to purchase larger quantities of the different types of glass or objects used in the panel design. However, the remaining costly steps of cutting and preparing the individual pieces of glass and objects, and the labor-intensive assembly procedures remain. Further, if one wanted to change the size or shape of the panel, redesign would be required. Even a "proportional" change in overall size of the panel, while maintaining the general design configuration, would require each piece of the panel to be resized, in a costly time-consuming process.

Accordingly, while the need exists for commercially available art glass panels, there are generally no commercially available sources for a consumer that provide the flexibility of enabling a consumer to select a design, to have that design applied to the panel or window size and configuration that suits the customer's unique needs, and to have the panel economically manufactured in a relatively short time frame. Further, there are no known commercial sources available which enable a customer to select an art glass design, and to have that design reconfigured and displayed to him in real time in the manner in which it would appear when reconfigured to accommodate the customer's desired panel size and shape requirements, so that the customer can view the unique product he will be ordering. Further, the prior art is deficient in providing any degree of automation which will accommodate manufacture of an art glass panel that accommodates the customer's selected design and unique panel size and shape requirements.

The present invention provides a commercial, practical solution to the above shortcomings of art glass panels. The present invention, through computerized assistance, allows a customer to select an art glass design from a plurality of such designs and to have that design reconfigured while he waits, according to unique rule-based design parameters, to conform to the unique size and shape of the customer's desired art glass panel. Further, when applied to windows, the present invention enables the customer to provide the size and shape of the "rough opening" he wishes the art glass design to fill, to select from a plurality of window styles and shapes that will in combination properly fit such rough opening and to have the art glass design automatically reconfigured to accommodate such window combination selection. The present invention also provides for an automated art glass manufacturing process that takes the information generated by those computers that uniquely design the customer's art glass panel and uses such computer generated information to automatically cut the glass pieces which collectively comprise the larger composite art glass panel.

SUMMARY OF THE INVENTION

The present invention provides an integrated system for selection, ordering and manufacturing art glass panels which enables the manufacturer to produce high quality art glass panels customized to the customer's own specifications through the use of highly flexible computer driven design and manufacturing systems. The art glass panels are customized in the sense that from a basic art panel design, the system of this invention will automatically alter or reconfigure the design pattern to accommodate the aperture dimensions specified by a customer. The system of this invention incorporates two-dimensional "rules" designed to retain the artistic appeal of the original art glass pattern design, even if it involves nonlinear expansion or contraction. In some cases there may even be a change in the pattern when progressing through certain aperture boundary dimensions. Through use of a rule-based design technique, an artist's design for an art glass panel is entered into a computer along with a set of appropriate rules applicable to that design, which are combined to produce an output data file representative of that art glass design. Such output data file for that design represents a "parent" file for that design which can then be reconfigured by use of a resizing program unique to this invention, to accommodate varying sizes and shapes of desired customer panels. A number of designs can be entered into a computer, each such design having its uniquely identifiable output data file that represents a parent data file for that particular design.

A customer can readily select one of the plurality of parent art glass designs, provide the computer with the unique size and configuration data for his desired panel, and ask the computer to reconfigure the parent design to accommodate his particular panel size and shape constraints. The customer can then view the reconfigured panel on the CRT display of the computer, and if satisfied with such design, readily order the reconfigured panel from the manufacturer. The input computers used by the customer can be remotely located from the manufacturer, providing for on-line real-time ordering by the customer. Further, the remote computers can instantly price the reconfigured panel prior to purchase, since all of the component part and assembly data information for such reconfigured panel is readily available to the computer computational programs, in digital form. Since such data is available in digital form, it can be readily transmitted with the order to the manufacturer and directly used for automating all or portions of the manufacturing process for the reconfigured/ordered panel. In particular, such digital output data file information is particularly useful for automatically controlling cutting operations for a water-jet cutter that can automatically cut the individual pieces of glass which comprise the composite reconfigured panel ordered by the consumer. The result is a highly efficient, commercially practical method of implementing the design, selection, ordering and manufacturing of art glass panels.

According to one aspect of the invention, there is provided a method of manufacturing art glass panels with the assistance of computer processing means, comprising the steps of:

(a) creating a rule-based art glass panel design;

(b) formatting the rule-based art glass panel design in an art glass data file signal; and (c) manufacturing an art glass panel in response to the art glass data file signal.

According to yet a further aspect of the invention, there is provided the capability for automatically manufacturing in part, the art glass panel, in response to the art glass data file signal.

According to a further aspect of the invention, there is provided a method of automating design selection and manufacture of art glass panels comprising the steps of:

(a) creating and storing in a computer a plurality of rule-based designs for art glass panels, each rule-based design being represented by an identifiable rule-based art glass design file;

(b) selecting from said stored rule-based designs one of the identifiable rule-based art glass design files;

(c) entering a desired art glass panel size representation into the computer; and (d) reconfiguring the selected art glass design file in the computer according to rule-based design principles to resize the selected rule-based design in response to the entered desired art glass panel size representation, providing a reconfigured rule-based art glass data file.

According to a further aspect of the invention, there is provided such a method wherein the customer can order manufacture of an art glass panel defined by the reconfigured rule-based art glass data file. According to yet a further aspect of the invention, the art glass panel is actually manufactured in response to the reconfigured rule-based art glass data file and can further be automatically manufactured in response to such file.

According to yet a further aspect of the invention, there is provided an integrated system for selecting, ordering and manufacturing art glass panels, comprising:

(a) first computer means suitable for receiving user input selections in the form of a rough opening dimension selection and an art glass panel design selection, for reconfiguring a selected rule-based art glass design to accommodate a selected rough opening dimension, wherein the first computer means includes:

(i) a plurality of rule-based art glass panel files, each representative of a different artistic art glass panel design;

(ii) user interface means for enabling a user to enter a rough opening dimension selection and an art glass panel design selection to the first computer means;

(iii) means for operatively applying the entered rough opening dimension selection and the entered art glass panel design selection to a resizing program means;

(iv) resizing program means for reconfiguring data from that one of the rule-based art glass panel files corresponding to a received art glass panel design selection, in rule-based manner, to resize the artistic art glass panel design represented thereby to conform to a rough opening dimension corresponding to a received rough opening dimension selection and for providing a reconfigured art glass data file signal in response thereto; and (v) means for providing an order output signal; and (b) means operatively connected to receive the reconfigured art glass data file signal and the order output signal for manufacturing an art glass panel in response to the reconfigured art glass data file signal and the order output signal.

According to yet a further aspect of the invention, such apparatus is provided wherein the means for manufacturing the art glass panels is remotely located from the computer means that receives the customer's order. According to yet a further aspect of the invention, the manufacturing means includes means for automating the manufacture of the art glass panel in response to the reconfigured art glass data file signal, wherein such automated manufacturing can include automated cutting of glass pieces for the panel, automatically cutting caming pieces used in the assembly, automatically providing an assembly template used in the assembly and automated soldering of the assembled caming pieces.

These and other aspects of the invention will become more apparent from the following more detailed description of the invention.

BRIEF DESCRIPTION OF THE DRAWING

Referring to the Drawing, wherein like numerals represent like parts throughout the several views.

DETAILED DESCRIPTION OF THE PREFERRED EMBODIMENT

Figure 1:
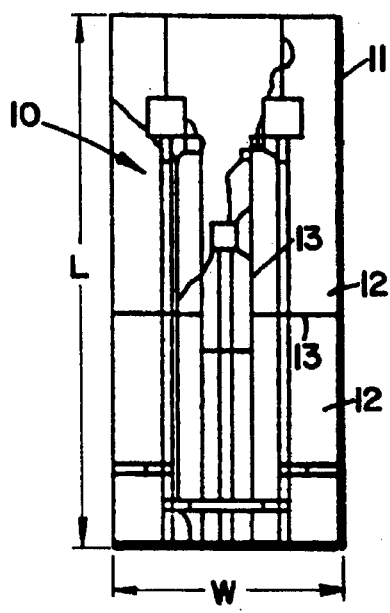
FIG. 1 illustrates an art glass design for a single panel, configured according to rule-based design principles of the present invention.

This invention incorporates and conceptually combines the tools provided by related patents and patent applications owned by the common assignee of this invention. Reference has already been made to U.S. patent application Ser. No. 08/016,902 filed on Feb. 12, 1993, by Hanson et al., for an invention entitled Divided Light Insert and Kit for Mounting. The disclosures and teachings of that application, which are hereby fully incorporated by reference, are relevant to a general understanding and description of the construction of typical art glass panels to which this invention applies. Such art glass panels are typically configured for attachment to or for forming an integral part of windows, but need not necessarily be used in association with windows. Other uses well-known in the art for art glass panels are included within the scope of this invention.

U.S. Pat. No. 4,972,318 issued on Nov. 20, 1990, to Brown et al. entitled Order Entry and Inventory Control Method, and herein incorporated by reference to the full extent of its disclosures and teachings relating to computerized ordering systems for building materials, is relevant to the extent that it describes a known computerized method for selecting and ordering building products such as windows from an inventory of such products. The general principles espoused in such patent with regard to computerized ordering, and particularly with respect to selecting components such as windows so as to accommodate the unique dimensions of the customer's rough size opening to be filled, are directly applicable to this invention to the extent that an art glass panel could be likened to a window or windows of the Brown patent, wherein the external dimensions of the desired art glass panel would be comparable to the rough opening dimensions of the Brown patent. Similarly, the availability of different art glass designs would be comparable to the availability of an inventory of window styles and configurations stored in the various memory files of the Brown patent computer. Further relevance of the Brown patent teachings to the principles of this invention will become apparent upon a more detailed description of the invention.

The basic order entry and inventory control method described by Brown has been commercially enhanced by the assignee of the present invention by using a relational database approach for configuring a product selection and ordering scheme. Such relational database approach is particularly useful with building materials such as windows which are purchased in sizes and combinations to fit rough opening dimensions conforming to the customer's requirements. This system is commercially marketed by the Applicants' assignee, Andersen Corporation, under its trademark ANDERSEN WINDOW OF KNOWLEDGE™, and is described in part in the previously cited U.S. patent application Ser. No. 07/716,651 to Barnes et al. filed on Jun. 14, 1991, and entitled Graphical Display Driven Database Method and Apparatus. Such system provides an extremely user friendly system for the customer which allows the selection of objects (such as building materials) from a computer screen, that are "graphical" in nature for call-up of non-graphical database information from the computer memories. The enhanced system provides ease of visualization, selection, quotation and ordering for a manufacturer's complete line of windows and related products. It will be obvious to those skilled in the art that the principles of the Barnes application apply equally well to the selection and handling of art glass designs and art glass panels as they do to the physical building components described in the Barnes application. To the extent that the disclosures and teachings of the Barnes patent are required for a more complete understanding or for support of the disclosures of the present invention, they are hereby fully incorporated by reference. Also, a more complete understanding of the ANDERSEN WINDOW OF KNOWLEDGE™ system can be had with reference to a publication entitled Andersen Window of Knowledge™ System—Features, Advantages and Benefits (November, 1992), by Andersen Corporation, the assignee of this invention.

The remaining two cited patent applications filed on Feb. 11, 1994, namely the Smith et al. patent application entitled Rule-Based Parametric Design Apparatus and Method and the Varghese et al. patent application entitled Waterjet Cutting Tool Interface Software, describe computerized techniques for performing automated art glass design "resizing" and manufacturing glass cutting functions respectively. Such functions are integrated into the overall integrated selection, ordering and manufacturing principles that form the basis for this invention. To the extent that the disclosures and teachings of these two applications are required to support the disclosures and an understanding of this invention, they are herein fully incorporated by reference.

This invention illustrates a practical commercial approach to providing a customer with a real-time ordering system for art glass panels that fit his unique panel size and configuration needs, and to providing an art glass manufacturer with an automated and relatively cost-effective method of producing the customer's unique art glass panels. The customer's selected art glass design is reduced to digital computerized format. The digital information is readily accessible by standard or readily adapted software for accounting, recording and manufacture tracking purposes. An obvious advantage for the customer is that the customer can immediately be provided with a cost estimate or firm quote of the sale price of the art glass panel that has been configured in his behalf at the time his art glass panel design is computer generated for him, and prior to his decision to order the panel. The customer also can have one or more customized art glass panel designs configured by the computer and have the ability to visually view the resultant creations on the computer's CRT screen prior to ordering.

From the manufacturer's perspective, since all of the piece-parts required to implement the customer's art glass design are generated by the computer in the art glass panel design process, the manufacturer has a complete costing record for the transaction, as well as a ready order list for the raw materials that will be required to fabricate the art glass panel. Further, since the computerized design is digital in nature, the customer can create/generate his desired art glass designs at remote locations such as at the retailers' or distributors' offices, and the order, once placed, can be immediately transmitted by appropriate telecommunication links to the manufacturer, without delay for order processing and the like.

The ability to adapt and reconfigure existing art glass designs to the unique size and shape requirements of the customer is of primary importance to this invention. The customer has a particular application or place that he wishes to fill with an art glass panel. For the purposes of ease of description throughout the remaining portion of this specification, the invention will be described with respect to its applicability of art glass panels to windows of a building. It will be understood, however, that the invention is not to be limited to a window application for such art glass panels, but that the principles of the invention apply in a much broader sense.

Except for instances of new construction, the customer is generally constrained to a particular size and configuration for his art glass panel. Such size and configuration limitations are fixed parameters that must be accommodated by the art glass designs of this invention. To achiever such accommodation, the present invention makes available to the customer one or more basic art glass designs which have been configured in accordance with a set of design parameters or rules, generally referred to as "rule-based design" parameters. Configuring art glass designs according to such rule-based considerations enables such basic art glass design to be changed according to the same rules that were used to formulate them. Such design changes can readily accommodate, for example, various sizes of the overall panel being designed, not only proportional enlargement or shrinking of the base design, but also to accommodate different external parameter sizes and shapes that would require disproportional resizing of the individual glass panes forming the panel. The rules not only provide for expansion and contraction changes, but for the addition and subtraction of lights or pieces to or from the panel respectively—all created in accordance with the same rules that were used to originally create the base or "parent" art glass design under consideration. The same rules enable expansion of the design to accommodate multiple subpanels of an overall art glass design. The ability to create any number and size and shape of such multiple subpanel designs is virtually unlimited. This concept is diagrammatically illustrated with reference to the attached figures.

Referring to FIG. 1, a basic art glass design for a single rectangular panel 11 is generally illustrated at 10. The panel 10 generally comprises a plurality of individual pieces of glass and/or objects (such as jewels or the like), generally designated at 12, and interconnected by caming strips generally designated at 13, in a manner well-known in the art. For a more complete description of such construction, the reader is referred to the above-referenced patent application to Hanson et al. The artistic design of the art glass panel 10 has been created according to a particular set of rule-based parameters of the type described in the above-referenced patent application to Smith et al. The art glass panel 10 has width and length (W) and (L) dimensions respectively, as illustrated in FIG. 1. If the customer chooses the art glass design of panel 10, and has the exact width and length dimensions of the panel illustrated in FIG. 1, the panel 10 can be directly manufactured from the specifications that relate to the "parent" design of the FIG. 1 panel 10.

Figure 2:
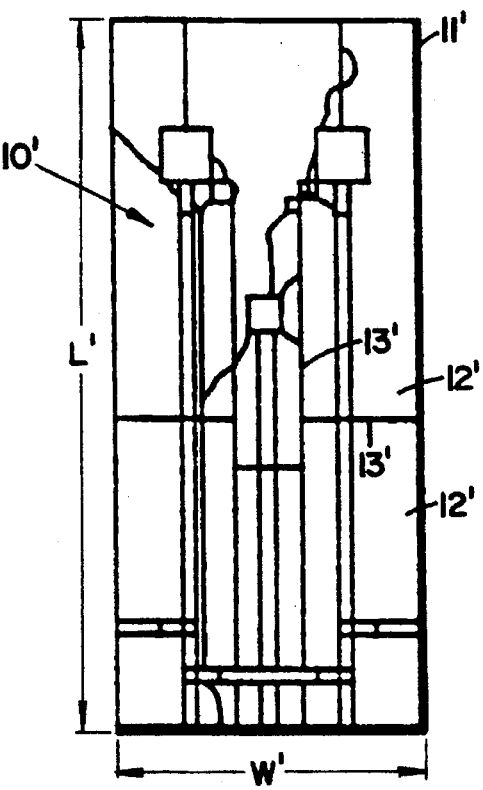
FIG. 2 illustrates the art glass design of FIG. 1 for a window panel having outer dimensions which are proportionately larger than those of FIG. 1, wherein the entire art glass design is proportionately reconfigured with respect to the comparable dimensions of FIG. 1, according to rule-based design parameters of the present invention.

However, if the customer's size configurations (i.e., rough opening or actual window size) are larger or smaller or differ in any way from the width (W) and length (L) dimensions of the FIG. 1 parent panel 10, the art glass design must be changed to accommodate the different panel length, width or shape dimensions. One such change of dimensions is illustrated in FIG. 2, wherein, relative to FIG. 1, the width (W') and length (L') dimensions of the art glass panel 10' of FIG. 2 are significantly larger than those of the art glass panel 10 of FIG. 1. For ease of description, the relative width and length dimensions of the panel 10' of FIG. 2 have been proportionately changed respectively with respect to those illustrated for the FIG. 1 panel. Also, for ease of understanding, the panels of FIGS. 1 and 2 have been proportionately "scaled" with respect to one another. If the customer desires the art glass configuration or design of FIG. 1 to be applied to a panel having the (W') and (L') dimensions of FIG. 2, all of the internal components or pieces of the art glass panel 10' must be resized proportionately (if permitted by the rule-based parameter design constraints for such parent design) in order to provide the desired design. Such proportionate resizing has been illustrated in FIG. 2, wherein the FIG. 2 art glass design 10' is exactly the same as, but proportionately larger than, the art glass design 10 of FIG. 1.

Figure 3:
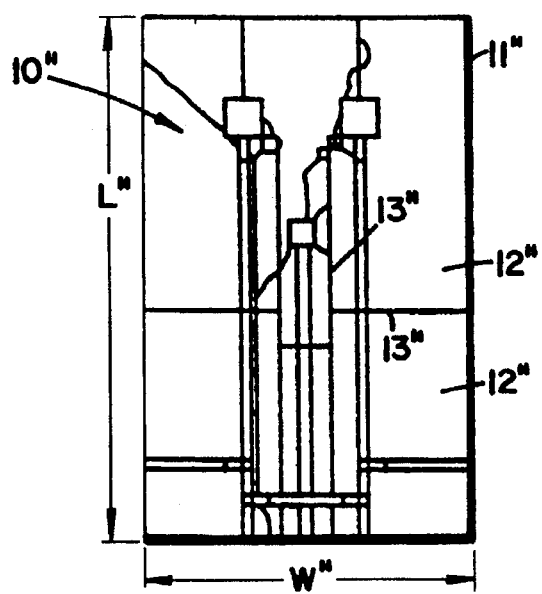
FIG. 3 illustrates the art glass design of FIG. 1 in a window panel having outer dimensions which differ in at least one dimension from those of FIG. 1, wherein at least portions of the art glass design have been reconfigured with respect to the comparable dimensions of FIG. 1, according to rule-based design parameters of the present invention.

A different situation exists, with reference to FIG. 3, wherein a customer desires the same general art glass design of FIG. 1, but wherein the external dimensions of the customer's panel are not proportional to those of FIG. 1, for which the original parent design is displayed. Referring to FIG. 3, it will be noted that while the length (L") dimension of panel 11" is the same as the (L) dimension of the FIG. 1 panel, the width (W") dimension of the FIG. 3 panel 11" is significantly more than the (W) dimension of the FIG. 1 panel. One possibility for resizing the panel of FIG. 1 to accommodate the enlarged width (W") dimension of the FIG. 3 panel 11" would be to retain the original size and shape of all of the "internal" portions of the design, and to increase the width of the "outer" pieces lying along the left and right edges of the panel 11" design, as illustrated in FIG. 3. The rule-based design capacity of the present invention enables such "reconfigurations" (such as illustrated in FIGS. 1–3) of the basic art glass design 10 to be rapidly made to accommodate any of the customer's desired panel dimensions, within the constraints of the rule-based design parameters that are established by the artist or designer for any given "parent" art glass design.

The rule-based parametric design feature of the present invention also allows the basic design principles of an art glass parent design to be expanded to multiple panels, while retaining the primary aesthetic principles of the design which are sought to be retained by the artist who created the parent design. The rule-based parametric design feature, not only allows extension of the design to multiple panels, but to panels of irregular or varied shapes, such as to trapezoidal, triangular, peak pentagon, arch shapes, and to other geometrical shapes.

Figure 4:
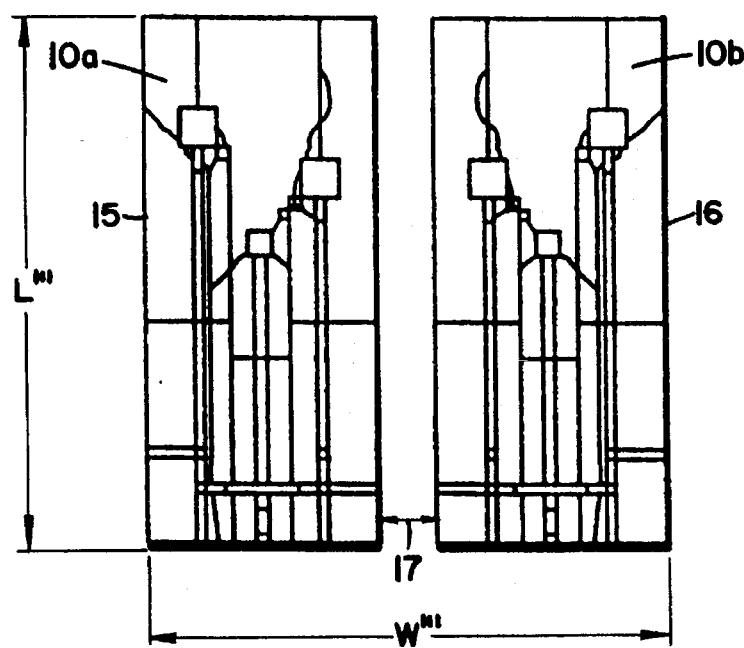
FIG. 4 illustrates the art glass design of FIG. 1 as expanded according to rule-based design parameters of the present invention, to accommodate two adjacent side-by-side panels.
Figure 5:
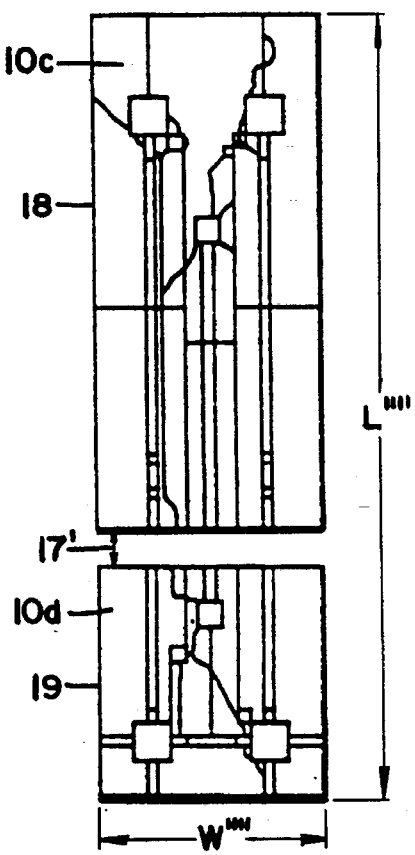
FIG. 5 illustrates the art glass design of FIG. 1 as expanded according to rule-based design parameters of the present invention to include two vertically adjacent panels.

FIGS. 4 and 5 illustrate examples of possible extensions of the parent art glass design 10 of FIG. 1 to multiple panels. FIG. 4 illustrates extension of the principles contained in the parent design 10 to complementary side-by-side panels 15 and 16, respectively containing reconfigured rule-based designs for the left and right panels illustrated at 10a and 10b respectively. Similarly, FIG. 5 illustrates a reconfigured art glass design based on the parent design 10 of FIG. 1 to include two vertically adjacent panels 18 and 19, wherein the rule-based reconfigured upper and lower panel designs are respectively indicated at 10c and 10d. With reference to FIGS. 4 and 5, it will be noted that the width and length dimensions for the designs, (which for windows also are correlatable to the rough opening dimensions for the window(s) to which the art glass panels will be attached), represent the composite width and length dimensions of the multiple panel structures, including the intermediate portions 17 thereof which would be filled by appropriate mulling material of the underlying windows.

Apparatus and a method for providing the rule-based design feature for this invention is described in the incorporated application of Smith et al. In reconfiguring a design according to the rule-based parameters, the "resizing" program basically manipulates arcs, lines and polylines, and takes into account parameters and peculiarities of the particular materials being used to implement the art glass design. Such materials include, by way of example, the pieces of differing glass which make up the panes or lights of the panel, the various objects such as bevels and jewels, and the came material which provides the metallic support structure for the individual pieces and for the panel as a whole. As will be understood by those skilled in the art, the "jewel" terminology is meant to refer to precast, dimensional glass pieces used in designs, which are typically available in stock sizes. The "bevel" terminology is used to represent cut and polished rectangular glass pieces and are generally purchased in presized configurations and are not available for "resizing" by the resizing software.

In general, once the resizing software reconfigures the selected rule-based art glass design to accommodate the size and configuration parameters of the customer's desired art glass panel, the reconfigured art glass design is completely available in digital format for use in such functions as: visual display on a CRT for the customer, manufacturer or the like; use in manufacturing operations by the manufacturer of the panel; use for costing purposes by the retail operation taking the customer's order and by the manufacturer in valuing its manufacturing costs; use by a manufacturer in ordering components for fabrication of the panel; use by the manufacturer to actually cut glass pieces conforming to the reconfigured design (as described in more detail hereinafter); and use by the manufacturer, the retailer and others involved in the distribution chain for accounting and tracking purposes.

It will be understood by those skilled in the art, that software incorporating the rule-based reconfiguration, or simply referred to herein as the "resizing engine," can physically reside in a plurality of locations throughout the system network. In a system wherein the customer makes selections and views results of the reconfiguration process to accommodate his unique particular design needs in real time, it is advisable to have a resizing engine resident in the computer being used by the customer at the retailer's or distributor's facilities. In the preferred embodiment, such programming would be incorporated within the ANDERSEN WINDOW OF KNOWLEDGE™ system. It is also generally desirable to have the resizing software capability at the manufacturer's facility, as well as possibly at the main offices of the company selling the windows, if different from the manufacturer.

In the preferred embodiment, an artist's art glass design that is desired to be a "parent" design of the system that can be reconfigured by a resizing engine, is first entered into a sophisticated piece of CAD equipment by the artist and/or designer who enters not only the actual design, but also the "rules" relating to the design. The CAD machine provides electronic drawings that are created using any commercially available three-dimensional CAD drawing software which is able to export data files in the Data Exchange Format (DXF), to an accuracy generally of ten decimal places. In the preferred embodiment, the artist designs were implemented in a CAD machine using the Vellum 3 D (V.2.12) drawing program written by Ashlar, Inc. As explained in the Smith et al. application, the DXF formatted information provided by the CAD machine contains much more than that needed by the resizing engine. Accordingly, the DXF file is first converted to an internal proprietary database format containing information particularly relevant to the resizing engine. The process of implementing art glass designs by means of the CAD machine is repeated for each desired "parent" design providing a plurality of such art glass design files, one each of such files corresponding to a different art glass design. The parent design files are stored in memory and are selectably accessible by the computer in response to user, or manufacturer's request for execution by the resizing engine.

For a complete description of the operation of one embodiment of the resizing engine, the reader is referred to the cited Smith et al. patent application. Upon completion of a resizing operation, the resizing engine provides an output file relating to the customer's uniquely reconfigured panel or panels in the DXF format which includes any relevant information that may have been removed from the DXF signal received by the resizing engine. The signal output from the resizing engine is usable by the various processors accessing the system, for such functions as costing or accounting, preview or viewing on a CRT, or for use in operations relating to manufacturing of the art glass panel(s). For those processing components requiring the resizing engine output to be in database file format, appropriate formatting means are provided for converting the DXF signal to the appropriate database signal desired, as is well-known in the art. A general functional block diagram representation of the above-described process for converting an artist design and set of rules related thereto to a rule-based design format usable by a resizing engine, is diagrammatically illustrated in FIG. 6.

Figure 6:
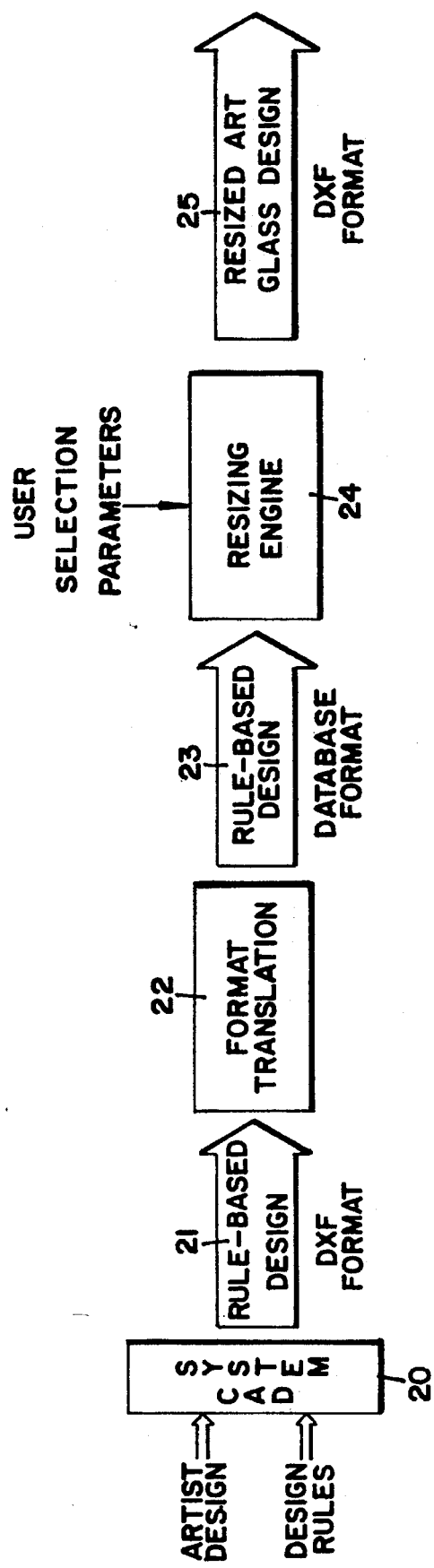
FIG. 6 represents a functional block diagram representation illustrating conversion of an art glass design and set of rules related thereto to a rule-based design format usable by a resizing engine, according to the principles of this invention.

Referring to FIG. 6, a typical CAD system is generally illustrated at 20, operatively connected for receiving an artist's design for an art glass panel configuration and the related set of "rules" peculiar to that design. As stated above, the rules control the behavior of the various design members that make up an art glass panel. Such rules allow the resizing engine to make intelligent decisions on the behavior of a design as it is scaled to fit in different openings and/or to appear in multiple panel groupings. The rules are specified by the artist and are embedded in the design, but can in theory be modified to a customer's tastes. The CAD system 20 combines the entered artist's design with the corresponding set of design rules and produces a rule-based design file generally indicated at 21, which is provided in DXF format. The rule-based design file 21 is translated by means of appropriate Format Translation means, generally indicated at 22, to a rule-based design file 23 configured in database format appropriate for use by the resizing engine 24. The resizing engine operates as above described to reconfigure the rule-based design file 23 in response to received User Selection Parameters, to produce a reconfigured/resized art glass design output file in the DXF format.

Figure 7:
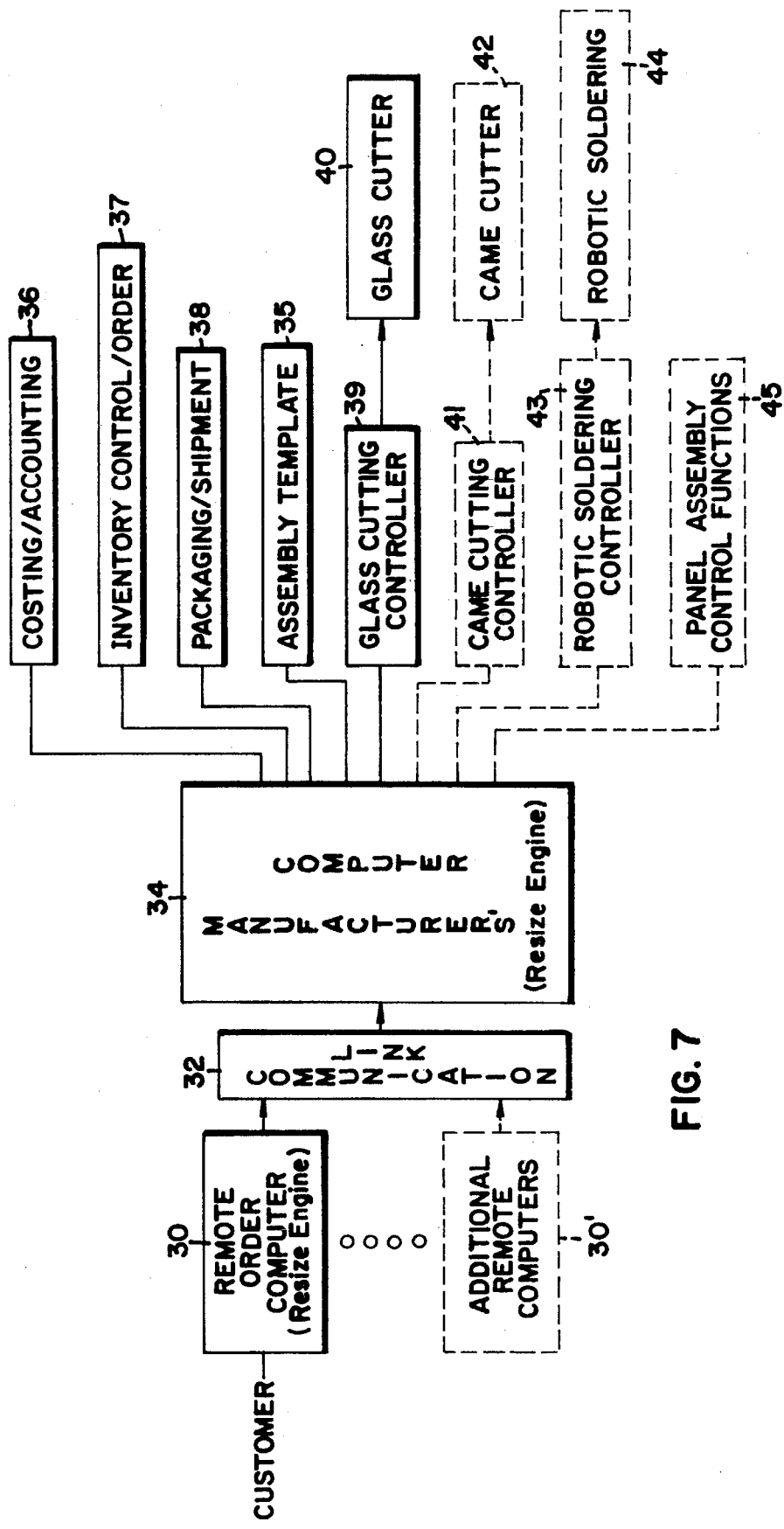
FIG. 7 is a functional block diagram representation of a preferred embodiment of a computer network system with which the present invention can be used.

FIG. 7 illustrates a functional block diagram representation of a preferred embodiment of a computer network system with which the present invention can be used. Referring thereto, there is generally illustrated at 30 one or a plurality of computer terminals configured for placement at remote locations such as at a retailer's or distributor's office, and usable by a consumer for design and placement of his art glass order, as described below. Such remotely located computers 30 may be of any general configuration well-known in the art, and could be of the type described in the cited U.S. Pat. No. 4,972,318 and more preferably of the ANDERSEN WINDOW OF KNOWLEDGE™ system type described in the referenced literature and in the cited Barnes et al. patent. Each of the remote computers 30 would include a resizing engine program of the type described above, for enabling a customer to select, and if necessary reconfigure, an art glass design that accommodates his specific artistic wishes and unique size and configuration constraints. The resized art glass design created by the resizing engine is digitally transmitted along with appropriate ordering information by means of an appropriate communications link 32 to the manufacturer's computer network, generally indicated at 34. The communication link 32 represents any appropriate telecommunication link that can transmit the digital design and ordering information from remote locations around the country, to a centralized manufacturing location. The manufacturer's computer 34 may represent one or a plurality of appropriate computers for performing the various operations and costing/accounting functions associated with manufacture and shipment of art glass panels. As stated above, the manufacturer's computer 34 preferably also contains a resizing engine 24 for enabling the manufacturer to further adjust a received design request to accommodate the manufacturing procedures employed by the manufacturer. The manufacturer's computer system 34 will also generally include a CAD system suitable for assisting in art glass panel design and for automating and/or controlling various ones of the art glass panel manufacturing operations.

The general function of Costing/Accounting directed by computer 34 is generally indicated at 36. The general function of Inventory Control and Ordering of parts and components related to the received art glass design, is generally indicated by the functional block 37, operatively connected for control by the computer 34. The function of Packaging and Shipment processing and control is generally indicated by the functional block 38, also shown as preferably being under the control of computer 34. The remaining functional blocks relate to the control of panel fabrication functions. Those illustrated by solid functional blocks have already been implemented by the Applicants with respect to the preferred embodiment configuration of the invention. Those indicated by dashed lines are contemplated within the scope of the invention. A significant advantage of having a reconfigured art glass design reduced to a readily usable digital format by the resizing engine 24 is that such information can be readily adapted to automatically control a waterjet glass cutting machine such as illustrated at 40. The waterjet cutting apparatus 40 is generally controlled by means of a glass cutting controller 39, which is in turn under the control of computer 34. Other contemplated functions that can be readily controlled by the computer 34 as a result of the rule-based file design information include: the cutting of the came pieces by means of a came cutter 42 as controlled by a came cutting controller 41; automatic or robotic soldering of the caming junctions by means of a robotic solderer 44 and its associated controller 43; and the general control of materials throughout the manufacturing process, generally indicated by the functional block labeled Panel Assembly Control 45.

Figure 8:
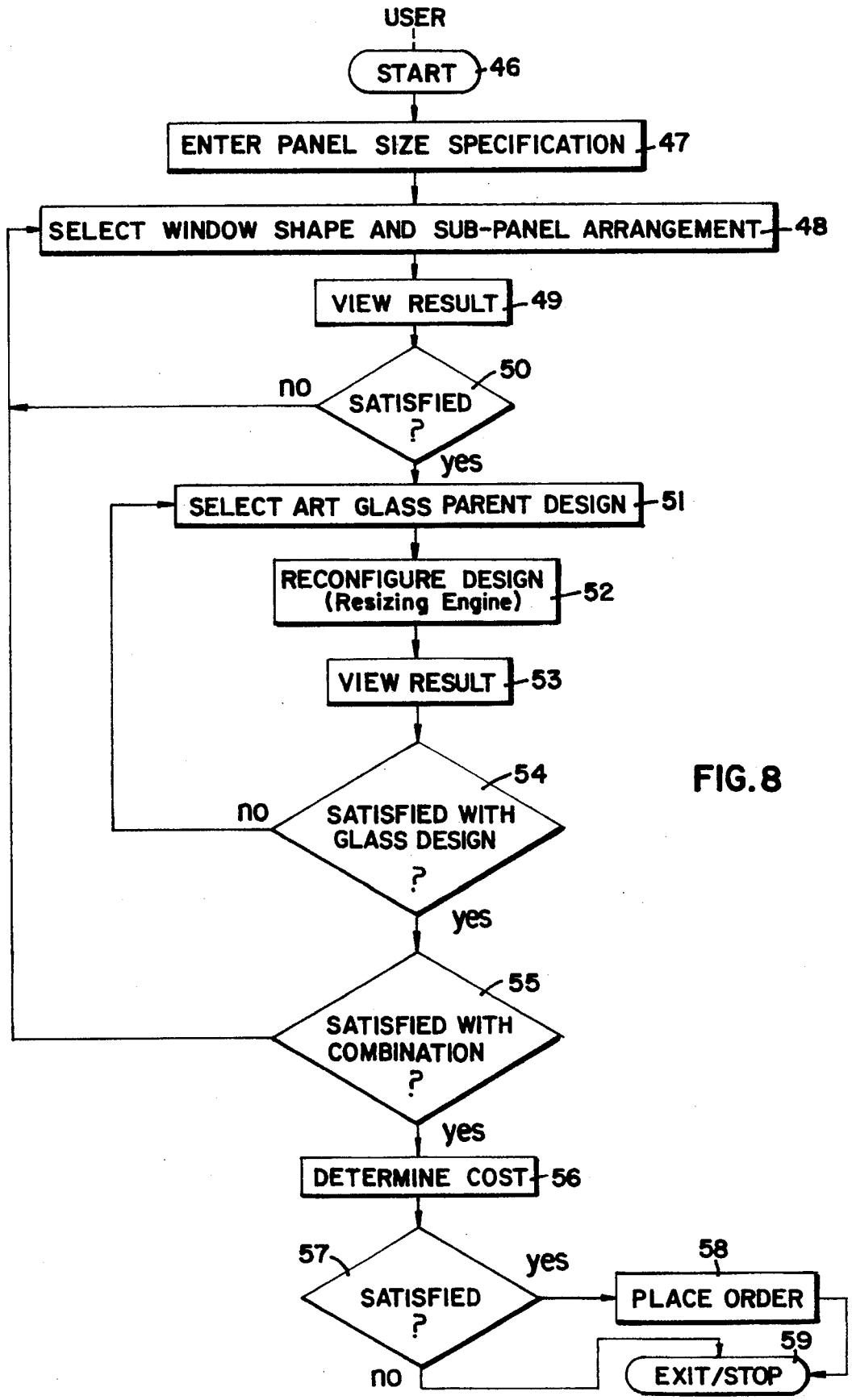
FIG. 8 represents a diagrammatic flow chart illustrating a method of selecting and ordering art glass panels in accordance with the principles of this invention.

A diagrammatic flow chart illustrating a method of selecting and ordering art glass panels in accordance with the principles of this invention is generally illustrated in FIG. 8. Referring thereto, the user (customer) begins the process (block 46) by entering his unique panel information into the remote computer terminal 30. The user enters the "size" specifications of the panel to be constructed, which in the case of a window configuration would generally represent the rough opening dimensions of the window (block 47). In an interactive system such as the ANDERSEN WINDOW OF KNOWLEDGE™ system, the computer would contain a step-by-step menu selection procedure guiding the user through the selection process. The available window configurations and combinations thereof for filling such rough opening dimension are stored in the computer's memory files and would be presented to the user for his selection of that window or plurality of windows in a particular combination that he would most desire for collectively filling the rough opening (block 48). In such an interactive system, the user would then view the graphical representation of the selected window(s) in the rough opening environment (block 49) and would make a decision (block 50) as to whether he is comfortable with that selection. If not entirely satisfied with the selection, he would repeat the window shape and/or combination selection of blocks 48 and 49, until satisfied.

Once satisfied with the window selection for filling the rough opening, the user will then select an art glass parent design (block 51) from an available library of such art glass designs configured according to the rule-based parameter principles described above, and which have been entered into the computer memory files. Such selection may include not only "parent" art glass designs, but also variations thereof, such as multiple color options for any particular parent design, multiple texture or jewel options or the like. The operator will then instruct the computer 30 to execute the resizing engine program 24 (FIG. 6) to reconfigure the selected parent art glass design for implementation to the selected window shape and/or combination of windows (block 52) and will then view the result (block 53) on the computer's CRT terminal. If not satisfied (block 54) with the viewed result, the user can return to block 51 for selecting another art glass parent design and/or option thereof. If satisfied with the reconfigured art glass design, but not with the particular base window combination previously selected in step 48, the user can return to step 48 to reselect a different base window combination, and repeat the succeeding steps until he returns to decision block 55 and is satisfied with the combined results of the base window combination and the selected reconfigured art glass design as applied thereto.

At this point, the cost of the selected composite art glass design can be determined (block 56). The user can then decide whether the cost of the art glass panel(s) is acceptable (block 57). If the costs are more than anticipated or not acceptable, the user can exit from the program 59 at this point. If the costs and all other design parameters appear satisfactory to the user, he can place an order (block 58) which is forwarded from the remote computer 30 through the telecommunications link 32 to the manufacturer's computer 34 (FIG. 7). Following placement of the order, the program is terminated (block 59). As previously described, the remote ordering computer may also contain costing and pricing information and accounting programs known in the art, such as described in cited U.S. Pat. No. 4,972,318 and in the ANDERSEN WINDOW OF KNOWLEDGE™ system.

As stated above, a preferred configuration for the glass cutter 40 is a high pressure waterjet cutting device. However, it will be understood that the principles of the invention apply to other two- or three-dimensional cutting devices. For glass cutting operations, a waterjet-type cutter is particularly useful. A waterjet cutting apparatus produces patterned lights of glass that are consistently more accurate and which can be considerably more complex than any artisans can produce, and eliminates many of the problems that apply with conventional methods of scoring and breaking of individual glass pieces, as used with conventional prior art techniques. The waterjet machinery, which cuts entirely through the glass, also enables intricate curved patterns to be readily cut through the glass, without breakage, and provides for chamfering corners and smooth edges, without additional grinding as has been required with prior art techniques. In general, the glass cutting controller 39 receives the rule-based art glass design DXF file, and provides a Computer Numeric Control (CNC) signal to the glass cutter 40 for controlling the glass cutting operation. A preferred configuration for implementation of the glass cutting controller 39 and its associated software is fully described in the cited Varghese et al. patent application entitled Waterjet Cutting Tool Interface Software, the disclosures and teachings which are hereby fully incorporated by reference. The glass cutting controller 39 and its associated software enables the glass cutter 40 to automatically cut all of the plurality of glass pieces required for configuring the art glass panel to be manufactured—all from information contained within the DXF file received from the resizing engine. The same DXF file can be directly used to automatically cut all of the caming required for use in assembling the art glass panel, and for operating a robotic or automated soldering equipment for soldering the came joints of the composite panel as will be readily appreciated by those skilled in the art.

The same DXF file information produced by the resizing engine 24 is directly usable in the assembly process for creating an assembly template, either in hard copy or by means of a projection screen or video screen projection, which displays a life-sized image of the art glass panel design on an assembly table, noting the exact location and identification of each part so that the individual glass pieces cut by the glass cutter 40 can be rapidly placed in their proper location on the assembly template. This feature is generally illustrated at 35 in FIG. 7.

Figure 9:
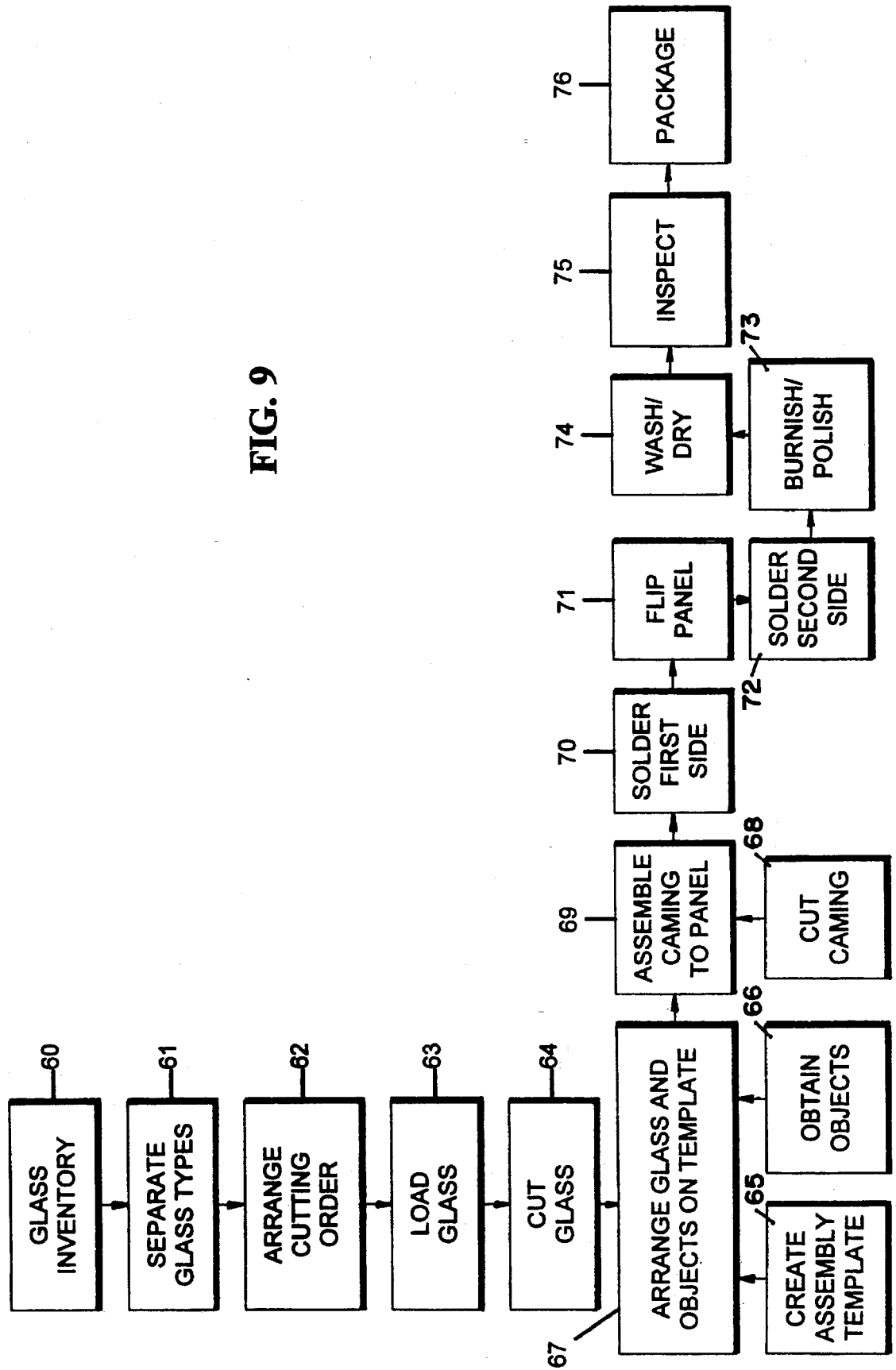
FIG. 9 is a diagrammatic block diagram illustration of the various process steps involved in manufacturing an art glass panel according to the principles of the present invention.

Referring to FIG. 9, the basic manufacturing steps for fabricating an art glass panel that has been designed by the rule-based methods of the present invention is generally illustrated in block diagram form. Referring thereto, collection of an appropriate inventory of sheets of glass having the appropriate colors, textures and the like contained within the selected reconfigured art glass design, is generally indicated at block 60. The sheets of glass within the inventory 60 are generally monolithic and are precut to an appropriate sheet size for handling by the automatic glass cutter 40. The glass sheets are separated by the glass types that will be used for the art glass panel under construction in the functional block 61, and are arranged in the proper cutting order in functional block 62. The glass sheets are then successively loaded onto the glass cutter 40 in functional block 63. The glass cutter 40 cuts all of the individual glass pieces for a particular color or texture or glass type from each successive sheet (block 64) until all of the cuttable glass components of the panel have been completed.

Simultaneously, under control of the computer 34, the assembly template will be generated and positioned on an assembly table (block 65). Also, at the same time, those non-cuttable "objects" such as jewels and bevels required for the art glass design will be assembled (block 66). Upon completion of cutting operations for each sheet of glass, the individual pieces that have been cut from that sheet and are to be used in the art glass panel are arranged in proper order on the assembly table according to the template design, along with the objects from block 66 required for the design (block 67).

While the cutting operation is proceeding, the individual caming pieces required for interconnecting the cut pieces of glass and objects will be cut (block 68) preferably under control of the computer 34. The cut caming pieces will then be added to the assembly of glass pieces and objects (block 69) and the integrated assembly will pass on to a first soldering station 70 wherein all of the joints between interconnecting caming pieces will be soldered, on one side of the panel. According to a preferred embodiment of the invention, the panel assembly will occur on air tables and an overhead gantry will transport panels from the waterjet cutter and along the assembly path. As previously stated, the soldering operation will preferably also be under control of the computer 34. Following the soldering operation of block 70, the panel will be flipped over (block 71) and the caming junctions on the previously unsoldered side of the panel will be soldered (block 72). The panel will then be subjected to any desired burnishing and polishing steps (block 73) after which it will be automatically cleaned by means of a washing and drying process (block 74). The completed panel is then ready for inspection (block 75) and packaging for shipment (block 76).

From the foregoing, it will be appreciated that an automated and integrated method and apparatus for selecting, ordering and manufacturing art glass panels has been disclosed. While the invention has been described with respect to a particular preferred embodiment thereof, and with respect to specific types of programs and components used therein, it will be understood by those skilled in the art that the invention is not to be limited in any manner by the specifics of either the described embodiment or to its particular functions or programming. The preferred embodiment has been described to illustrate a clear example of how the principles of the invention can be specifically applied to the design, ordering and manufacturing of art glass panels. All alternatives and modifications of the foregoing are intended to be covered within the broad scope of the appended claims.

What is claimed is:

1. An integrated system for selecting, ordering and manufacturing art glass panels, comprising:
    (a) first computer means suitable for receiving user input selections in the form of a rough opening dimension selection and an art glass panel design selection, for reconfiguring a selected rule-based art glass design to accommodate a selected rough opening dimension, said first computer means comprising:
        (i) a plurality of rule-based art glass panel files, each representative of a different artistic art glass panel design;
        (ii) user interface means for enabling a user to enter a rough opening dimension selection and an art glass panel design selection to said first computer means;
        (iii) means for operatively applying said entered rough opening dimension selection and said entered art glass panel design selection to a resizing program means;
        (iv) resizing program means for reconfiguring data from that one of said rule-based art glass panel files corresponding to a received art glass panel design selection, in rule-based manner, to resize the artistic art glass panel design represented thereby to conform to a rough opening dimension corresponding to a received rough opening dimension selection and for providing a reconfigured art glass database file signal in response thereto; and
        (v) means for providing an order output signal; and
    (b) means operatively connected to receive said reconfigured art glass data file signal and said order output signal, for manufacturing an art glass panel in response to said reconfigured art glass data file signal and said order output signal.

2. The apparatus of claim 1, wherein said means for manufacturing said art glass panel comprises: second computer means operatively connected to receive said reconfigured art glass data file signal and said order output signal, for automating in part said manufacturing of said art glass panel.

3. The apparatus of claim 2, wherein said second computer means is remotely located from said first computer means, and further including communication link means interconnecting said first and said second computer means for transmitting said reconfigured art glass data file signal and said order output signal from said first computer means to said second computer means.

4. The apparatus of claim 1, wherein said means for manufacturing said art glass panel includes means for automatically cutting glass pieces comprising at least in part the artistic design of said art glass panel, in response to said reconfigured art glass data file signal.

5. The apparatus of claim 1, wherein said first computer means further is suitable for receiving a user input selection in the form of a window combination selection, and further comprises:
    (a) a product identification data file containing representations of a plurality of window products available for filling rough openings;
    (b) program means operatively connected to receive said entered rough opening dimension selection and operatively connected with said product identification data file for selecting those combinations of window products from said product identification data file that are available to fill a rough opening, corresponding to said entered rough opening dimension selection, and for providing a plurality of available window combination output signals representative thereof;

(c) means for enabling a user to select one of said available window combination output signals; and (d) wherein said resizing program means is further operable to receive said user one selected window combination signal and is further operable for performing its reconfiguration operations in response to said one selected window combination and for producing said reconfigured art glass data file in response thereto; wherein the reconfigured database file signal represents the user selected art glass panel design as reconfigured to accommodate both the rough opening size and window combination selections of the user.

6. The apparatus as recited in claim 1, wherein said means for manufacturing said art glass panel includes means for automatically cutting caming pieces used in the assembly of the artistic design of said art glass panel, in response to said reconfigured art glass data file signal.

7. The apparatus as recited in claim 1, further including means for providing an assembly template used in the assembly of the art glass panel, in response to said reconfigured art glass data file signal.

8. The apparatus as recited in claim 1, further including means for automatically soldering caming pieces used in assembly of the art glass panel, in response to said reconfigured art glass data file signal.

9. A method of producing art glass panels with the assistance of computer processing means, comprising the steps of:
   (a) creating a rule-based art glass panel design comprising the steps of:
      (i) creating an artistic representation of an art glass panel design;
      (ii) entering said artistic representation into an automated CAD processing system;
      (iii) entering a set of rules uniquely identifiable with the creation of said artistic representation, into said CAD processing system; and
      (iv) processing said entered artistic representation in response to said entered rules within said CAD processing system, to create said rule-based art glass panel design;
   (b) formatting said rule-based art glass panel design in an art glass data file signal;
   (c) entering said art glass data file signal into a computer processing means; and
   (d) manufacturing an art glass panel in response to said art glass data file signal.

10. The process of claim 9, wherein said manufacturing step includes the step of automatically manufacturing in part said art glass panel with said computer processing means and in response to said art glass data file signal.

11. The process of claim 10, wherein said step of automatically manufacturing in part said art glass panel comprises the step of automatically cutting component glass piece portions of said art glass panel in response to said art glass data file signal.

12. The process of claim 9, wherein the step of manufacturing the art glass panel is performed remotely from the steps of creating and formatting the art glass panel design.

13. The process as recited in claim 9, including the step of reconfiguring said art glass file signal to resize the art glass panel design, to provide a reconfigured art glass file signal in response to said resizing; and wherein said manufacturing step is performed in response to said reconfigured art glass file signal.

14. A method of automating design selection for manufacture of art glass panels comprising the steps of:
   (a) creating and storing in a computer a plurality of rule-based designs for art glass panels, each rule-based design being represented by an identifiable rule-based art glass design file;
   (b) selecting from said stored rule-based designs one of said identifiable rule-based art glass design files;
   (c) entering a desired art glass panel size representation into said computer; and
   (d) reconfiguring said selected art glass design file in said computer according to rule-based design principles to resize the selected rule-based design in response to said entered desired art glass panel size representation, providing a reconfigured rule-based art glass data file.

15. The method as recited in claim 14, further including the step of ordering the manufacture of an art glass panel defined by said reconfigured rule based art glass data file.

16. The method as recited in claim 14, further including the step of manufacturing an art glass panel in response to said reconfigured rule-based art glass data file.

17. The method as recited in claim 16, wherein said manufacturing step includes the step of automatically controlling at least one phase of the manufacturing step in response to said reconfigured rule-based art glass data file.

18. The method as recited in claim 17, wherein the automated step includes automatically cutting glass pieces forming at least in part the art glass design of the art glass panel being manufactured in response to said reconfigured rule-based art glass data file.

19. The method as recited in claim 18, wherein said automatic cutting process includes the step of automatically controlling a jet glass cutting machine.

20. The method as recited in claim 14, further including the step of entering a desired subpanel configuration representation for the art glass panel to be manufactured, into the computer; and wherein the step of reconfiguring said selected art glass design file includes resizing the selected rule-based design in response in part to said entered desired subpanel configuration representation; whereby the reconfigured art glass panel design extends in rule-based manner over the desired subpanel configuration.

21. The method as recited in claim 14 including the steps of
   (a) entering representations of a plurality of window products of varied sizes and shapes into the computer memory file;
   (b) determining from said plurality of window product representations in the computer memory file, a plurality of different combinations of such window product representations which identifiably correspond with said entered desired art glass panel size representation;
   (c) selecting a desired one of said plurality of different combinations of such window product representations; and
   (d) wherein said reconfiguration step further resizes and reconfigures the selected rule-based design and produces said reconfigured rule-based art glass data file in response to said selected one of said window product representation combination; whereby the reconfigured art glass panel design extends in rule-based manner over the selected window product combination.

* * * * *

UNITED STATES PATENT AND TRADEMARK OFFICE
CERTIFICATE OF CORRECTION

PATENT NO. : 5,570,292

DATED : 10/29/96

INVENTOR(S) : Abraham et al.

It is certified that error appears in the above-identified patent and that said Letters Patent is hereby corrected as shown below: In column 1, lines 26-27 delete "application Ser. No. 08/194,922, filed on Feb. 11, 1994" and replace with —number 5,548,698, issued August 20, 1996—.

In Column 1, line 30, delete "application Ser. No. filed on February 11, 1994" and replace with —number 5,584,016, issued December 10, 1996—.

Signed and Sealed this

Thirtieth Day of March, 1999

*Attest:*

Q. TODD DICKINSON

*Attesting Officer*      *Acting Commissioner of Patents and Trademarks*